Sept. 20, 1938.  W. W. SLOANE  2,130,601
KERF CUTTING MACHINE
Original Filed Aug. 17, 1935  5 Sheets-Sheet 1
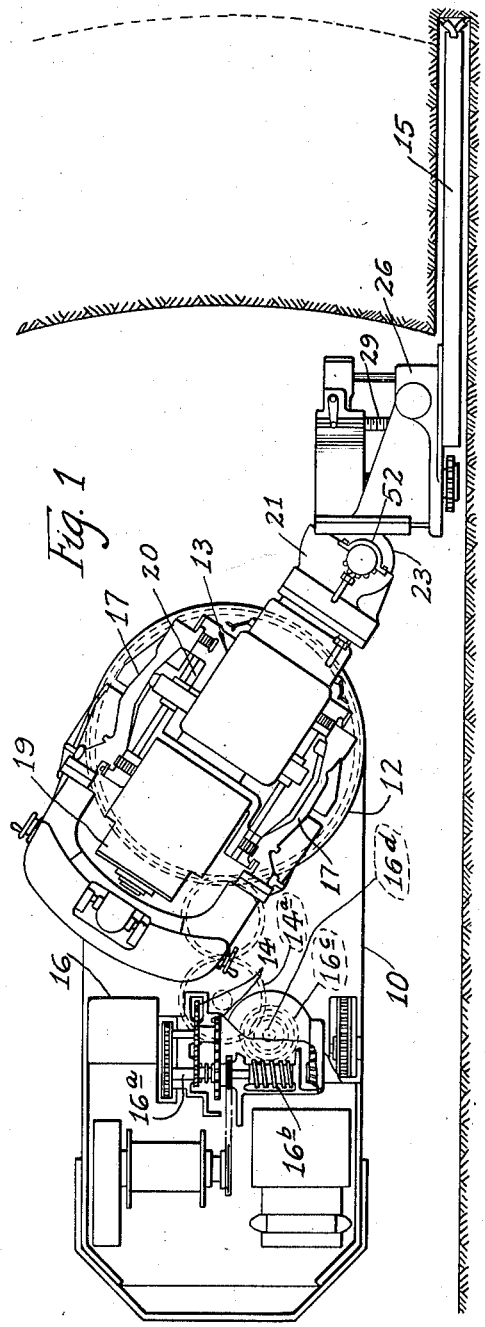
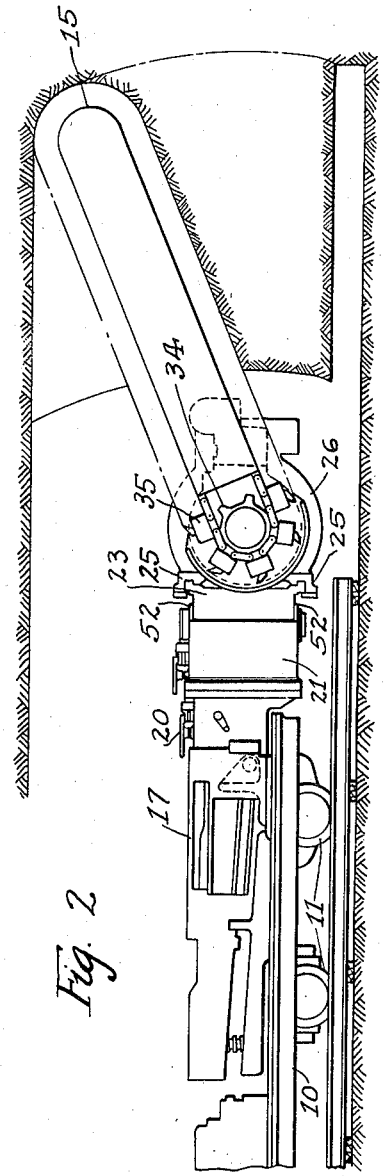
Witness:
Erwin C. Lange
Inventor:
William W. Sloane
Clarence F. Poole
Attorney

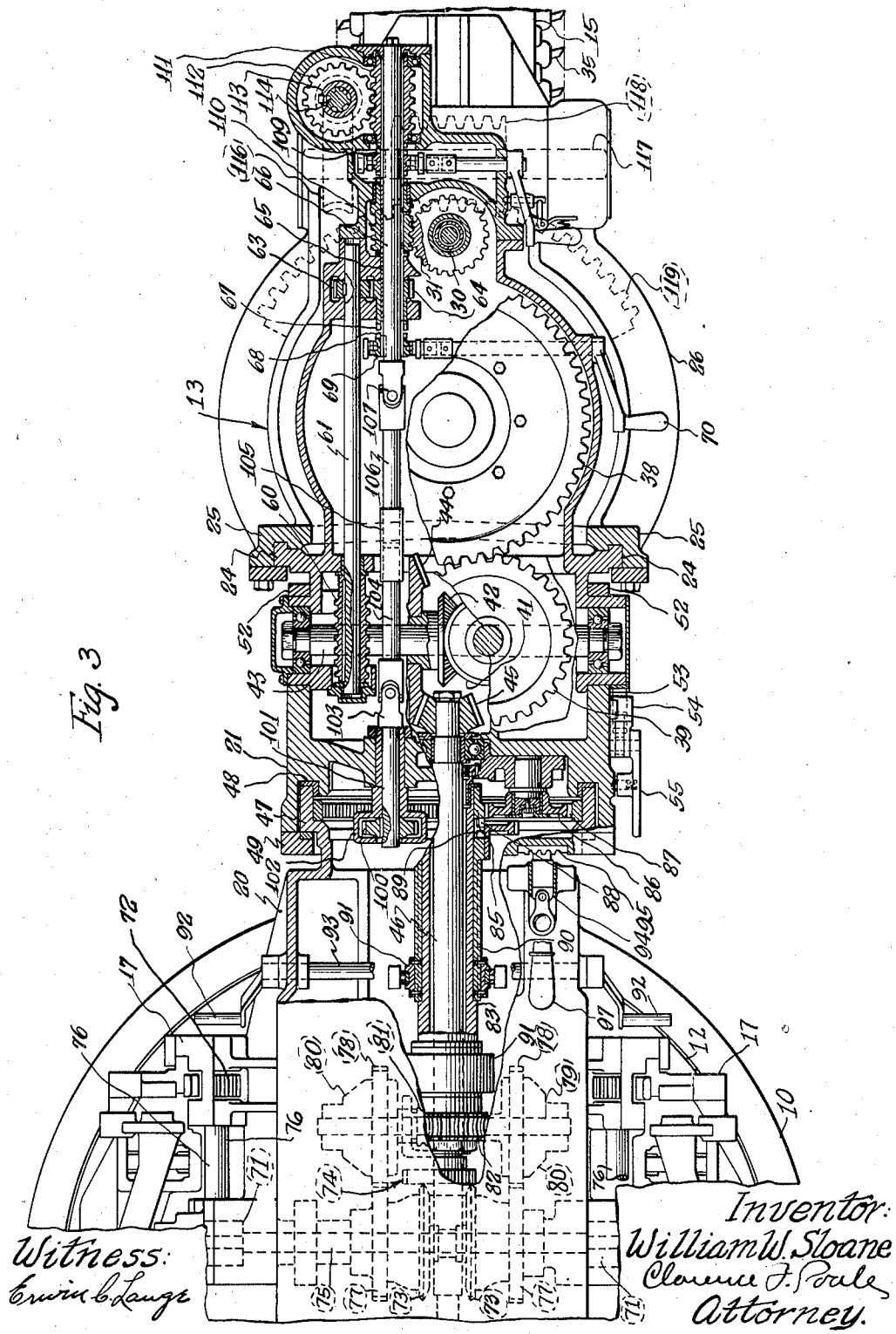

Sept. 20, 1938. W. W. SLOANE 2,130,601
KERF CUTTING MACHINE
Original Filed Aug. 17, 1935 5 Sheets-Sheet 3
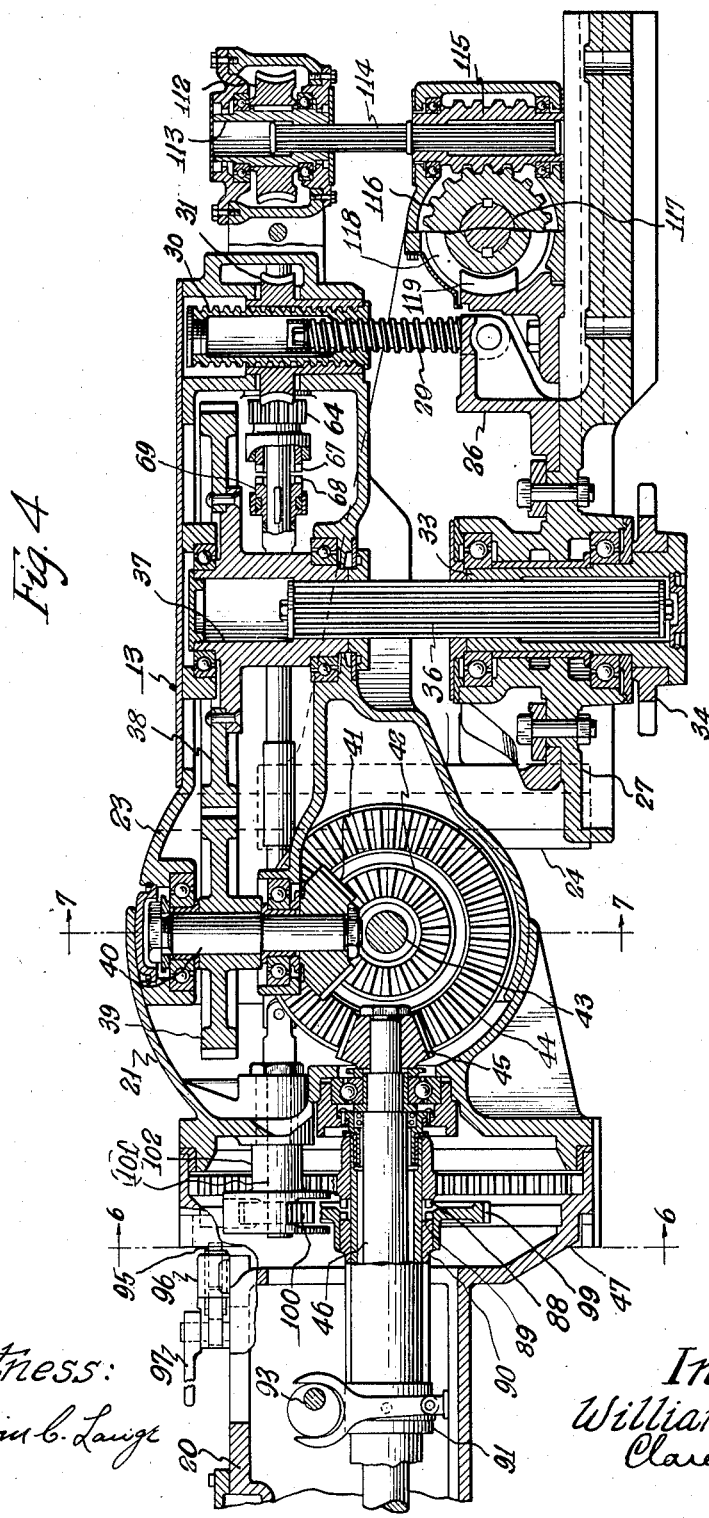

Sept. 20, 1938.   W. W. SLOANE   2,130,601
KERF CUTTING MACHINE
Original Filed Aug. 17, 1935   5 Sheets-Sheet 4

Witness:
Erwin C. Lange

Inventor:
William W. Sloane
Clarence F. Poole
Attorney.

Sept. 20, 1938.  W. W. SLOANE  2,130,601
KERF CUTTING MACHINE
Original Filed Aug. 17, 1935  5 Sheets-Sheet 5

Witness:
Erwin C. Lange

Inventor:
William W. Sloane
Clarence F. Poole
Attorney.

Patented Sept. 20, 1938

2,130,601

UNITED STATES PATENT OFFICE 2,130,601

KERF CUTTING MACHINE

William W. Sloane, Chicago, Ill., assignor to Goodman Manufacturing Company, Chicago, Ill., a corporation of Illinois Application August 17, 1935, Serial No. 36,620
Renewed June 10, 1937

13 Claims. (Cl. 262—28)

This invention relates to improvements in kerf-cutting machines of the so-called universal or combination type adapted to cut vertical or shearing kerfs in the mine wall and horizontal kerfs adjacent the mine roof or floor or at various intermediate positions with respect thereto.

The principal objects of this invention are to provide a new and improved kerf-cutting machine of the class described so arranged that shearing cuts may be made along either rib while the machine is on a track intermediate the ribs. Another object of my invention is to provide a novel means for supporting the cutter bar for cutting such a kerf, together with a novel form and arrangement of drive gearing for pivoting the cutter bar by power about an axis extending longitudinally of the machine, about an axis perpendicular thereto and about a third axis perpendicular to said last-mentioned axis.

Other objects of my invention will appear from time to time as the following specification proceeds.

My invention may best be understood by referring to the accompanying drawings in which:

Figure 1 is a top plan view of a mining machine having the features of my invention embodied therein and showing the cutter bar positioned for cutting a shearing kerf along one rib of the working place;

Figure 2 is a side elevation of the machine shown in Figure 1;

Figure 3 is an enlarged plan view of the forward portion of the machine shown in Figure 1, with parts in a different position than in Figure 1, and with certain parts broken away and shown in horizontal section to clearly illustrate certain features of my invention;

Figure 4 is a fragmentary longitudinal sectional view taken through the forward portion of the machine, illustrating certain details of my invention;

Like reference characters refer to like parts throughout the various figures.

Figure 5:
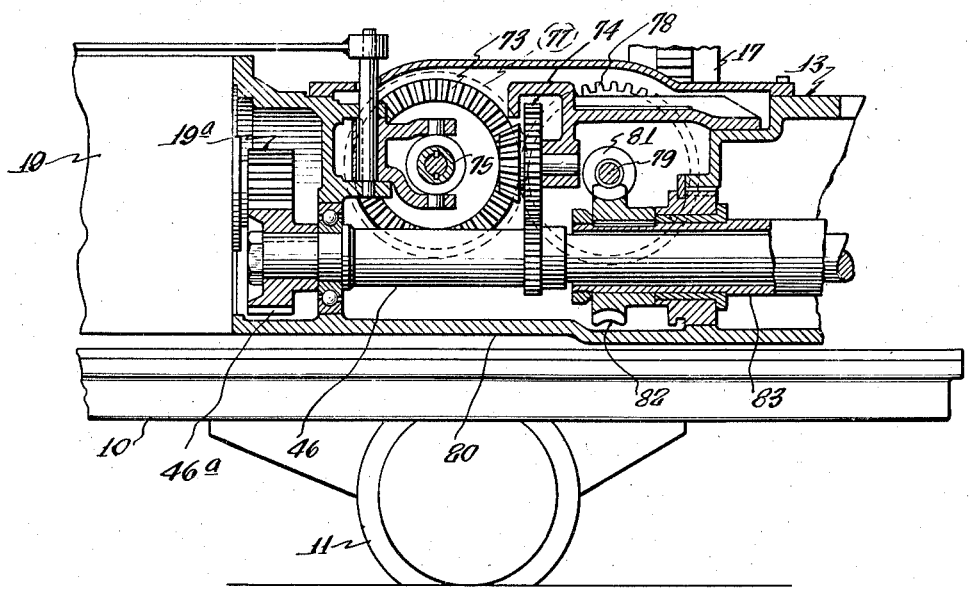
Figure 5 is a partial fragmentary longitudinal sectional view similar to Figure 4, but showing a portion of the machine disposed rearwardly of the portion shown in Figure 3, in order to clearly illustrate the drive connection from the motor to the operating parts of the cutting element.

In the drawings the main elements of the embodiment of my invention illustrated are similar to those illustrated in a prior application, Serial No. 659,522, filed by me on March 3, 1933, which issued as Patent No. 2,027,456, on January 14, 1936, and an application, Serial No. 747,342, filed by Herman W. Driehaus on October 8, 1934, which issued as Patent No. 2,053,467 on September 8, 1936, so will only be described insofar as is necessary to clearly illustrate the novel features of my present invention. Said main elements include a truck frame 10 mounted on track wheels and axles 11, 11 and having a turntable 12 mounted on the forward end thereof and forming a support for a cutting element, generally indicated by reference character 13.

Said truck is adapted to be propelled about the mine at a travelling speed for moving the machine from working place to working place, or at a feeding speed for sumping a forwardly projecting cutter bar 15 into the coal by means of a motor 16 mounted on said truck rearwardly of said turntable. Said motor drives a transverse shaft 16a at either a high or low speed by means of plural speed reduction gearing, generally indicated by reference character 14. A drive connection is provided from said shaft to the track wheels for driving said track wheels, and another drive connection is provided from said shaft for turning the turntable 12 at either a high positioning or low feeding speed. Said last-named drive connection includes a worm 16b on the shaft 16a which meshes with a worm gear 16c on the upper end of a vertical shaft 16d. Reduction gearing, generally indicated by reference character 14a is driven from the lower end of said shaft for turning the turntable 12 in the usual manner. Said worm and worm gear are of the self-locking type so that the turntable may be locked in various desired positions of adjustment with respect to the truck frame.

The cutting element 13 is supported on the turntable 12 for vertical movement with respect thereto on a pair of widely spaced parallel upstanding guides 17, 17. Said guides, as herein shown, are trunnioned on said turntable for movement about a transverse axis disposed adjacent the forward end thereof and are also counter-balanced to counteract the weight of the overhanging forward end of said cutting element. Said guides and details of the trunnion supports and means for adjusting said frame will not herein be described in detail since they form no part of my present invention.

The cutting element 13 generally includes a motor 19 of an ordinary electrical type which is secured to and extends rearwardly from a main support frame 20. Said frame is supported in the parallel-spaced upstanding guides 17, 17 for vertical adjustment with respect to the turntable for vertically adjusting the position of the cutter bar 15 with respect to the mine bottom or roof.

A turning or positioning frame 21 is supported on the forward end of the elevator frame 20 for pivotal movement with respect thereto about a longitudinal axis for positioning the cutter bar for cutting top, bottom or shearing kerfs. Said positioning frame extends forwardly of the turntable and has a cutter frame 23 pivotally mounted thereon for pivotal movement with respect thereto about an axis perpendicular to said longitudinal axis. Said cutter frame forms a means for supporting the cutter bar 15, and while it may be a single frame having the cutter bar projecting therefrom, it is herein preferably shown as having a pair of parallel-spaced gibbed guides 24, 24 extending therefrom which are adapted to be engaged by a pair of corresponding guides 25, 25 extending from a support frame 26 movable towards and away from said cutter frame. Said last-mentioned frame forms a pivotal support for a swinging frame 27 to permit said frame to swing about an axis perpendicular to said last-mentioned axis. Said swinging frame forms a supporting means for the cutter bar 15 in a usual manner.

The support frame 26 and swinging frame 27 are adjustably moved towards and away from the pivotal frame 23 by means of a threaded shaft or screw 29 pivotally secured to said support frame adjacent one of its ends and threaded within a threaded sleeve 30, which threaded sleeve is in turn threaded within a hub of a worm gear 31 journaled in said pivotal frame adjacent the forward end thereof and driven from the motor 19 by a suitable gear train which will hereinafter be more fully described.

The details of the supporting connection between the swinging frame 27 and the support frame 26 are similar to those shown in my aforementioned prior application, so will not herein be described in detail. In Figure 4, it will be seen that said swinging frame has an internal splined sleeve 33 journaled therein which sleeve has a sprocket 34 secured to the lower end thereof for driving a cutter chain 35 about the cutter bar 15. Said splined sleeve is in turn driven by means of a splined shaft 36 slidably movable with respect to said spur gear and slidably mounted in a hub 37 of a spur gear 38, which hub is journaled in the pivotal frame 23 in a well-known manner. Said spur gear is driven by a spur gear 39 keyed to a shaft 40 which shaft is journaled in said cutter frame adjacent the rearward end thereof in a suitable manner. A bevel pinion 41 is secured to the inner or lower end of said shaft and meshes with and is driven from a bevel gear 42 on a shaft 43 disposed transversely of said cutter frame and coaxial with the axis of pivotal movement thereof. Said shaft is in turn driven by means of a bevel gear 44 meshed with and driven by a bevel pinion 45 on the forward end of a shaft 46 extending longitudinally of and journaled in said main support frame in a suitable manner and disposed coaxial with the axis of pivotal movement of said turning frame. Said shaft is in turn driven from the motor 19 by means of a motor pinion 19a which meshes with and drives a spur gear 46a on the rearward end of said shaft.

The main support frame 20 is provided with an enlarged annular forward portion 47, a portion of which is herein shown as depending below the top of the turntable 12. Said forward portion forms a bearing support means for the rearward end of the turning frame 21, as may clearly be seen with reference to Figures 3 and 4. The details of this support are similar to those shown in my aforementioned prior application, Serial No. 659,522, now Patent No. 2,027,456, so will not be described in detail. As herein shown, a shouldered bearing 48 abuts the forward end of and a portion of the under side of said annular forward portion. Said shouldered bearing engages the inside of a suitable groove formed in said second frame and forms a bearing for said frame. An outer portion of said turning frame extends over the outer periphery of said annular forward portion and has a suitable retaining member 49 secured to the rearward end thereof. Said retaining member abuts a suitable shoulder formed on the inner side of said annular forward portion.

Figure 8:
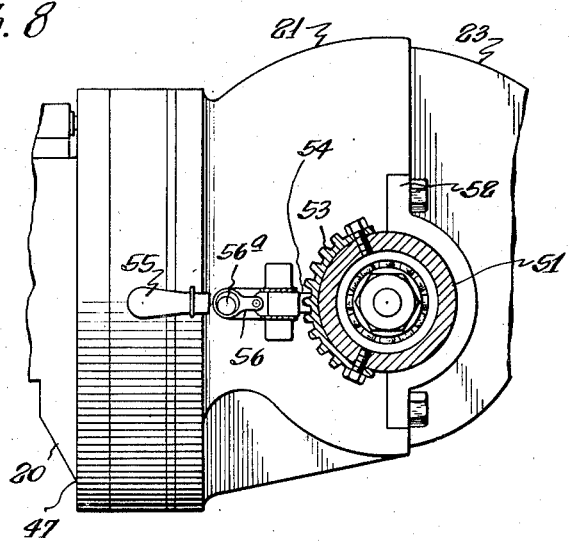
Figure 8 is a detail view showing certain details of the locking mechanism for locking certain of the frames in fixed relation with respect to each other.
Figure 6:
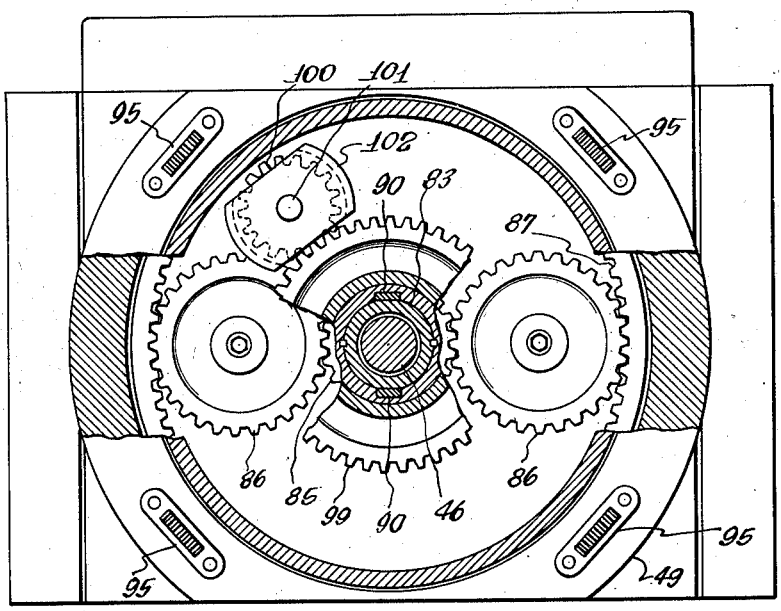
Figure 6 is a sectional view taken substantially along line 6—6 of Figure 4.

The cutter frame 23 is pivotally connected with the turning frame 21 by means of a pair of integrally formed bosses 50 and 51 extending outwardly from opposite sides of said cutter frame adjacent the rearward end thereof. Said bosses are journaled in suitable bearings formed in the forward end of said turning frame. One half of the bearing for each of said bosses is formed in the forward portion of said turning frame and the other half is formed by a suitable cap piece 52 held thereto by means of suitable cap screws in a usual manner (see Figures 1, 3 and 8).

Said frames are held in fixed relation with respect to each other by means of a gear sector 53 secured to the boss 51 which is adapted to be engaged by a toothed end of a locking pin 54 slidably mounted in said frame. Said locking pin is engaged with or disengaged from said gear sector by means of a suitable hand lever 55 through a link 56 engaging a pin 56a eccentric of the center of said hand lever. Thus, the cutter bar supporting frame 23 may be pivoted about an axis perpendicular to the axis of pivotal movement of the turning frame 21 and held in varying positions of adjustment with respect thereto when desired.

Figure 7:
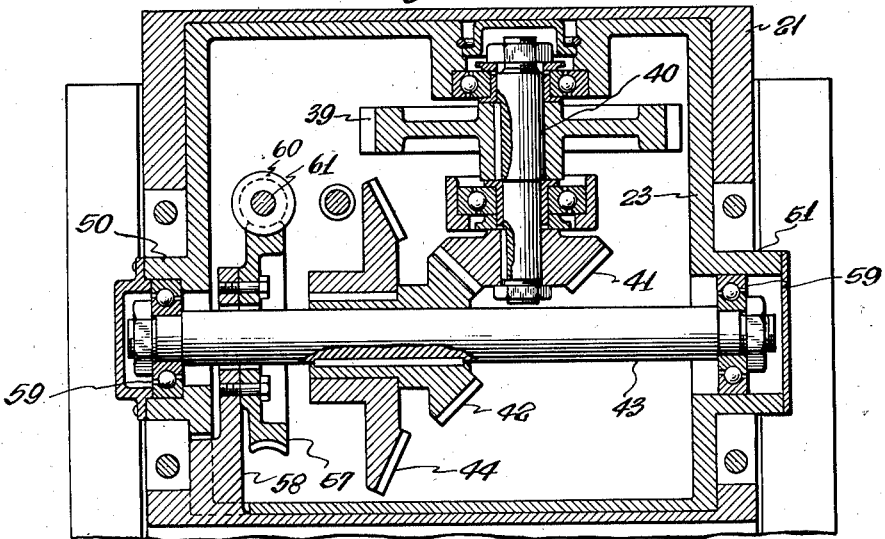
Figure 7 is a sectional view taken substantially along line 7—7 of Figure 4.

The means for pivotally moving said cutter frame with respect to said turning frame includes a worm gear 57 secured to a member 58 projecting inwardly of and upwardly from said turning frame, and herein shown as being formed integral therewith (see Figure 7). Said worm gear is arranged coaxially with the pivotal axis of said cutter bar supporting frame and said worm and member are bored to permit the shaft 43 to pass therethrough, which shaft is journaled at its ends in the bosses 50 and 51 in suitable ball bearings 59, 59. Said worm gear is meshed with a worm 60 on the rearward end of a shaft 61 journaled in and extending longitudinally of said cutter frame. Said worm and worm gear are of a self-locking type to prevent pivotal movement of said cutter bar support frame with respect to said turning frame, except upon rotation of the shaft 61.

A spur gear 63 is keyed to the shaft 61 adjacent the forward end thereof and meshes with and is driven from a spur gear 64 journaled on a sleeve 65 mounted on a shaft 66 extending longitudinally of said cutter bar support frame. Said spur gear is also journaled on its hub in said frame and is provided with a pair of rearwardly extending clutch jaws 67 adapted to be selectively engaged by clutch jaws 68 extending forwardly from a clutch member 69 feathered on said shaft. Said clutch member is moved along the shaft 66 for selectively engaging the clutch jaws 68 with clutch jaws 67 by means of a hand lever 70 and a suitable system of levers of an ordinary construction which will not herein be described in detail. When the clutch jaws 68 engage the clutch jaws 67 the cutter frame 23 may be pivotally moved about its axis of pivotal connection to the turning frame 21 by power driven mechanism driven by the motor 19 in a manner which will more clearly appear as this specification proceeds.

Referring now particularly to Figures 3, 4 and 5, and the drive connection from the shaft 46 to the operating parts of the cutting element 13, a pair of oppositely disposed bevel gears 73, 73 are driven from said shaft through a gear train, generally indicated by reference character 74. Said bevel gears are selectively connectible with a transversely extending shaft 75 for driving said shaft in reverse directions without reversal of the motor 19. Said transverse shaft is operatively connected adjacent its ends through suitable self-locking worm gearing, generally indicated by reference character 71, to a pair of parallel-spaced shafts 76, 76 for vertically moving said cutting element in the guides 17, 17 by means of pinions 72, 72 on opposite ends thereof in a manner clearly set forth in my prior application, Serial No. 659,522.

Spur gears 77, 77 are oppositely rotated by the bevel gears 73, 73 and mesh with spur gears 78, 78 freely mounted on a transverse shaft 79. Said last-named spur gears may be selectively connectible with said shaft by means of suitable friction clutches 80, 80 of a usual construction. A worm 81 keyed on said shaft meshes with and drives a worm gear 82 keyed on a sleeve 83 coaxial with the longitudinal shaft 46 and freely rotatable with respect thereto.

The sleeve 83 forms a drive member for a gear train for rotating the turning frame 21 about a longitudinal axis and for other gear trains for driving the shaft 66 in reverse directions without reversal of the motor 19 in the following manner:

A spur pinion 85 is freely mounted on the forward end of the sleeve 46 and meshes with and drives spur gears 86, 86 mounted in the turning frame 21 on opposite sides of the center of said spur pinion. Said spur gears mesh with an internal gear 87 keyed on the inside of the annular forward portion 47 of the main support frame 20, so that rotation of said gears will cause pivotal movement of the turning frame 21 about an axis disposed longitudinally thereof.

The spur pinion 85 has integrally formed clutch jaws 88, 88 extending rearwardly therefrom which are adapted to be engaged by clutch jaws 89, 89 extending forwardly from and formed integral with feather keys 90, 90 feathered on the sleeve 83. Said feather keys are secured adjacent their rearward ends to a clutch collar 91 and are moved along the sleeve 83 by said clutch collar to selectively engage the clutch jaws 89 with the clutch jaws 88 by means of a suitable system of links and levers operated by hand cranks 92, 92 on opposite ends of a shaft 93 extending transversely of the elevator frame 20 in a usual manner.

The turning frame 21 is held in fixed relationship with respect to the elevator frame 20 by means of a locking pin 94 having a toothed engaging end. Said locking pin is slidably mounted in the frame 20 and is adapted to engage one of a plurality of toothed sectors or racks 95, 95 secured to the rearward face of the retaining member 49. A suitable hand lever 97 is provided to engage said toothed member with or disengage said toothed member from said racks in the same manner the member 54 is engaged with any of the teeth 53.

The shaft 66 is driven by means of a spur gear 99 slidably mounted on the sleeve 83 and keyed thereto by means of the feather keys 90, 90. Said spur gear is adapted to selectively mesh with a spur gear 100 keyed on the inner end of a shaft 101 journaled in a housing and frame member 102. Said housing and frame member is open at opposite sides thereof to permit the spur gear 99 to be meshed with the spur gear 100 and is secured in the turning frame 21 in a suitable manner. A universal joint 103 is provided on the forward end of the shaft 101. Said universal joint is of an ordinary construction, so will not herein be shown or described in detail, and includes a shaft 104 extending forwardly therefrom and slidably mounted in a sleeve 105 for rotating said sleeve. A shaft 106 is slidably mounted in the opposite end of said sleeve and is rotated thereby. Said shaft has a universal joint 107 extending rearwardly from its rearward end which is connected with the forward end of the shaft 66 for driving said shaft. It will thus be seen that an extensible universal drive connection has been provided between the spur gear 100 and shaft 66 for driving said shaft when the cutter frame 23 is in various positions of adjustment with respect to the turning frame 21.

Referring now particularly to the drive from the shaft 66 for moving the support frame 26 towards or from the cutter frame 23 and for swinging the cutter bar at a feeding speed, a clutch member 109 is feathered on said shaft intermediate worms 110 and 111. The worm 110 is journaled on the sleeve 65 and has suitable clutch jaws formed integral therewith adapted to be engaged by corresponding clutch jaws on said clutch member. Said worm meshes with the worm gear 31 for driving said worm gear and elevating or lowering the cutter bar with respect to the mine bottom. It should be understood that reversal of said worm gear is effected without reversal of the motor 19 by means of the clutch members 80, 80 on the shaft 76.

The worm 111 is likewise provided with integral clutch jaws adapted to be engaged by corresponding clutch jaws on the clutch member 109 and said worm meshes with and drives a worm gear 112 keyed on a splined sleeve 113 journaled in the pivotal frame 23 adjacent the forward end thereof. A splined shaft 114 is slidably mounted within said splined sleeve adjacent one of its ends and its opposite end is slidably mounted within the splined hub of a worm 115 journaled in the support frame 26. Said worm meshes with and drives a worm gear 116 keyed on a transverse shaft 117. A worm 118 is likewise keyed on said transverse shaft and meshes with a worm gear sector 119 secured to and extending upwardly from the swinging frame 27. The worm 118 and worm gear sector 119 are of the self-locking type so that the cutter bar may be automatically locked from pivotal movement with respect to said support frame, except when the shaft 117 is driven from the motor 19. The cutter bar 15 may thus be pivotally moved about the axis of the cutter chain sprocket 34 at a feeding speed when the cutter frame 23 is in various positions of adjustment with respect to the turning frame 21, and when said turning frame is in various positions of adjustment with respect to the main support frame 20.

With reference to Figure 1, it may be seen that the machine is positioned to cut a shearing kerf in a coal face adjacent the rib by pivoting the turning frame about a longitudinal axis until the cutting plane of the cutter bar is vertical, and also pivoting the cutter frame about its axis of pivotal connection to said turning frame and turning the turntable so that the cutting plane of the cutter bar is adjacent and parallel to the rib. The cutting operation is the same as with other machines of the shearing type; that is, the cutter bar is positioned so that its forward end is adjacent the mine roof and the machine is sumped into the coal by movement of the truck 10 along the track at a feeding speed. When the cutter bar has been sumped into the coal to the required depth, it is pivoted about the axis of the cutter chain sprocket 34 in a downward direction until said cutter bar approaches the floor when it is withdrawn from the kerf by movement of the truck along a track in a rearward direction.

While I have herein shown and described one embodiment of my invention, it will be understood that the construction and arrangement of the various parts may be altered or changed without departing from the spirit or scope thereof. Furthermore, I do not wish to be construed as limiting myself to the specific form illustrated, excepting as it may be limited in the appended claims.

I claim as my invention:

1. In a mining machine and in combination with a track mounted truck, a turntable on said truck, a pair of parallel spaced vertically extending guides mounted on said turntable for adjustment with respect thereto about a transverse axis disposed adjacent their forward end, a cutting element mounted in said guides for vertical movement with respect to said turntable, said cutting element including a motor, a frame projecting forwardly of said turntable and truck, a turning frame pivotally mounted on said frame for pivotal movement about an axis extending longitudinally thereof, a cutter frame mounted on said turning frame for pivotal movement with respect thereto about an axis perpendicular to the pivotal axis of said turning frame, a support frame mounted on said cutter frame for movement towards and from said cutter frame in a plurality of parallel planes, and a cutter bar projecting from and pivotally mounted on said support frame for pivotal movement with respect thereto about an axis perpendicular to the cutting plane thereof.

2. In a mining machine, a base frame, a turntable on said base frame, a cutting element mounted on said turntable for vertical adjustment with respect thereto, said cutting element including a motor, a frame projecting forwardly of said motor, a turning frame pivotally mounted on said frame for pivotal movement about an axis extending longitudinally thereof, a cutter frame mounted on said turning frame for pivotal movement about an axis perpendicular to the pivotal axis of said turning frame, a support frame mounted on said cutter frame for rectilinear movement towards and from said cutter frame in a plurality of parallel planes, and a cutter bar having a cutter chain movable thereabout projecting from and pivotally mounted on said support frame for movement about an axis disposed perpendicular to the cutting plane thereof, drive connections from said motor for vertically adjusting said cutting element with respect to said turntable, other drive connections from said motor for driving said cutter chain about said cutter bar including a shaft coaxial with the axis of said turning frame, another shaft eccentric of the axis of said turning frame for adjustably moving said cutter bar towards and from said cutter frame and swinging said cutter bar at a feeding speed, and another shaft driven from said eccentric shaft for pivotally moving said cutter frame with respect to said turning frame.

3. In a mining machine, a base frame, a turntable on said base frame, a cutting element mounted on said turntable for vertical adjustment with respect thereto, said cutting element including a motor, a frame projecting forwardly of said motor, a turning frame pivotally mounted on said frame for pivotal movement about an axis extending longitudinally thereof, a cutter frame mounted on said turning frame for pivotal movement about an axis perpendicular to the pivotal axis of said turning frame, a support frame mounted on said cutter frame for rectilinear movement towards and from said cutter frame in a plurality of parallel planes, and a cutter bar having a cutter chain movable thereabout projecting from and pivotally mounted on said support frame for movement about an axis disposed perpendicular to the cutting plane thereof, drive connections from said motor for vertically adjusting said cutting element with respect to said turntable, other drive connections from said motor for driving said cutter chain about said cutter bar including a shaft coaxial with the axis of said turning frame, another shaft eccentric of the axis of said turning frame and forming a drive member for adjustably moving said cutter bar towards and from said cutter frame and swinging said cutter bar at a feeding speed, and another shaft driven from and parallel with said eccentric shaft for pivotally moving said cutter frame with respect to said turning frame.

4. In a mining machine, a truck having a turntable thereon, cutting mechanism mounted on said turntable including a chain carrying cutter bar, and means for positioning and supporting said cutter bar for cutting in various positions with respect to the mine wall including shearing kerfs along either rib including a frame mounted on said turntable and extending beyond the forward end of said truck, a turning frame pivotally mounted on said first-mentioned frame for pivotal movement about an axis extending longitudinally thereof, a cutter frame pivoted to said turning frame for pivotal movement with respect thereto about an axis perpendicular to the pivotal axis of said turning frame, a support frame mounted on said third-mentioned frame for movement towards and away from said third-mentioned frame in a plurality of parallel planes, said cutter bar being mounted on said third-mentioned frame for pivotal movement about an axis perpendicular to the cutting plane thereof, power driven means for swinging said cutter bar at a feeding speed and selectively moving said support frame towards and from said cutter frame including a power driven shaft mounted in and extending longitudinally of said cutter frame, and other means selectively driven from said shaft for pivoting said cutter frame about its axis of pivotal connection to said turning frame including a shaft journaled in said cutter frame parallel to said first-mentioned shaft and selectively driven from said first-mentioned shaft, and a worm on said shaft meshing with a worm gear disposed coaxial with and fixed from movement with respect to said turning frame.

5. In a mining machine, a truck having a turntable thereon, cutting mechanism mounted on said turntable including a motor having a frame extending forwardly therefrom beyond the forward end of said turntable, a turning frame extending forwardly of the forward end of said first-mentioned frame and mounted thereon for pivotal movement about a longitudinal axis, means driven by said motor for moving said turning frame about said longitudinal axis, a cutter frame pivoted to said turning frame for pivotal movement with respect thereto about an axis perpendicular to the pivotal axis of said turning frame, means driven by said motor for pivoting said cutter frame about its axis of pivotal connection to said turning frame including a shaft mounted in said turning frame, and a second shaft driven thereby and having a gear thereon having operative engagement with a fixed gear coaxial with the pivotal axis of said cutter frame, a support frame mounted on said cutter frame for movement towards and away from said cutter frame in a plurality of parallel planes, means driven by said motor for moving said support frame towards and from said cutter frame including a threaded shaft having a nut thereon and a selective drive connection from said first-mentioned shaft to said threaded shaft, a chain-carrying cutter bar mounted on said cutter frame for pivotal movement about an axis perpendicular to the plane of travel of said cutter chain, and means driven by said motor for pivotally moving said cutter bar at a feeding speed about its axis of pivotal connection to said support frame when said frames are in various positions of adjustment with respect to each other including another selective drive connection from said first-mentioned shaft to said cutter bar.

6. In a track-mounted mining machine, a truck having a turntable thereon, cutting mechanism mounted on said turntable including a motor having a frame extending forwardly therefrom beyond the forward end of said turntable, a turning frame extending forwardly of the forward end of said first-mentioned frame and mounted thereon for pivotal movement about a longitudinal axis, a cutter frame pivoted to said turning frame for pivotal movement with respect thereto about an axis perpendicular to the pivotal axis of said turning frame, a support frame mounted on said cutter frame for movement towards and away from said cutter frame in a plurality of parallel planes, a chain-carrying cutter bar mounted on said support frame for pivotal movement about an axis perpendicular to the plane of travel of said cutter chain, and means driven by said motor for pivotally moving said cutter bar about its axis of pivotal connection to said support frame at a feeding sped when said frames are in various positions of adjustment with respect to each other including a longitudinal shaft, and means driven from said shaft for selectively pivoting said cutter frame with respect to said turning frame including a parallel shaft journaled in said cutter frame and a geared drive connection from the rearward end of said parallel shaft to said turning frame.

7. A mining machine of the class described comprising a track-mounted truck having a turntable thereon, cutting mechanism projecting forwardly of said turntable and mounted thereon including a motor, a frame projecting forwardly of said motor and turntable, a projecting cutter bar having a cutter chain movable thereabout, means for supporting said cutter bar for pivotal movement about axes perpendicular and parallel to its cutting plane including a cutter frame pivotally mounted on said first-mentioned frame for pivotal movement about a transverse axis, and means driven by said motor for independently pivotally moving said cutter bar about said aforementioned axes including a gear journaled in said first-mentioned frame, a shaft journaled in said last-mentioned frame, a drive connection from said shaft for pivoting said last-mentioned frame about its axis of pivotal connection to said first frame, another drive connection from said shaft for pivoting said cutter bar about an axis perpendicular to said last-mentioned axis, and a universal extensible drive connection between said gear and shaft.

8. A mining machine of the class described comprising a track-mounted truck having a turntable thereon, cutting mechanism projecting forwardly of said turntable and mounted thereon including a projecting cutter bar having a cutter chain movable thereabout, a motor on said turntable, means for supporting said cutter bar for pivotal movement about an axis extending longitudinally of said motor, about an axis perpendicular to said axis and spaced forwardly of said turntable, and about an axis perpendicular to said last-mentioned axis and spaced forwardly thereof, means driven by said motor for driving said cutter chain about said cutter bar when in various adjusted positions with respect to said turntable, and other means driven by said motor for pivoting said cutter bar about said longitudinal and transverse axes and pivotally moving said cutter bar about said last-named axis at a feeding speed, including a shaft extending longitudinally of said motor and a universal extensible drive connection between said motor and shaft.

9. In a track-mounted mining machine, a truck having a turntable thereon, cutting mechanism mounted on said turntable including a motor having a frame extending forwardly therefrom beyond the forward end of said turntable, a turning frame extending forwardly of the forward end of said first-mentioned frame and mounted thereon for pivotal movement about a longitudinal axis, a cutter frame pivoted to said turning frame for pivotal movement with respect thereto about an axis perpendicular to the pivotal axis of said second-mentioned frame, a support frame mounted on said cutter frame for movement towards and away from said cutter frame in a plurality of parallel planes, a chain-carrying cutter bar mounted on said support frame for pivotal movement about an axis perpendicular to the plane of travel of said cutter chain, means driven by said motor for pivotally moving said cutter bar about its axis of pivotal connection to said support frame at a feeding speed when said frames are in various positions of adjustment with respect to each other including a gear driven by said motor and disposed coaxial with the axis of pivotal movement of said turning frame, a gear journaled in said turning frame and driven thereby, a shaft journaled in said cutter frame, a drive connection from said shaft to said cutter bar for pivoting said cutter bar, and a universal extensible drive connection from said gear to said shaft.

10. In a track-mounted mining machine, a truck having a turntable thereon, cutting mechanism mounted on said turntable including a motor having a frame extending forwardly therefrom beyond the forward end of said turntable, a turning frame extending forwardly of the forward end of said first-mentioned frame and mounted thereon for pivotal movement about a longitudinal axis, a cutter frame pivoted to said turning frame for pivotal movement with respect thereto about an axis perpendicular to the pivotal axis of said turning frame, a support frame mounted on said cutter frame for movement towards and away from said cutter frame in a plurality of parallel planes, a cutter bar having a cutter chain movable thereabout mounted on said support frame for pivotal movement about an axis perpendicular to the cutting plane of said cutter bar, means driven by said motor for driving said cutter chain about said cutter bar, and means driven by said motor for pivotally moving said cutter bar about its axis of pivotal connection to said support frame at a feeding speed when said aforementioned frames are in various positions of adjustment with respect to each other, said drive connections including a shaft coaxial with the pivotal axis of said turning frame and driven by said motor, a gear coaxial with the pivotal axis of said cutter frame driven by said shaft, a shaft perpendicular to the axis of rotation of said gear and driven thereby, another gear driven by said shaft and an extensible drive connection from said gear to said cutter chain, a sleeve coaxial with said longitudinal shaft and driven by said motor, a gear driven thereby, a gear journaled in said turning frame and driven by said last-named gear, a shaft journaled in said cutter bar support frame, an extensible drive connection from said shaft to said cutter bar for pivoting said cutter bar at a feeding speed, and a universal extensible drive connection from said gear to said shaft.

11. In a track-mounted mining machine, a truck having a turntable thereon, cutting mechanism mounted on said turntable including a motor having a frame extending forwardly therefrom beyond the forward end of said turntable, a turning frame extending forwardly of the forward end of said first-mentioned frame and mounted thereon for pivotal movement about a longitudinal axis, means driven by said motor for pivoting said turning frame about said longitudinal axis, a cutter frame pivoted to said turning frame for pivotal movement with respect thereto about an axis perpendicular to the pivotal axis of said turning frame, means driven by said motor for pivoting said cutter frame about its axis of pivotal connection to said turning frame, a support frame mounted on said cutter frame for movement towards and away from said cutter frame in a plurality of parallel planes, means driven by said motor for moving said support frame towards and from said cutter frame, a chain-carrying cutter bar mounted on said support frame for pivotal movement about an axis perpendicular to the plane of travel of said cutter chain, and means driven by said motor for pivotally moving said cutter bar about its axis of pivotal connection to said support frame at a feeding speed when said frames are in various positions of adjustment with respect to each other, said means for pivoting said frames and moving said support frame towards and from said cutter frame being driven from a common sleeve coaxial with the axis of said turning frame.

12. In a track-mounted mining machine, a truck having a turntable thereon, cutting mechanism mounted on said turntable including a motor having a frame extending forwardly therefrom beyond the forward end of said turntable, a turning frame extending forwardly of the forward end of said first-mentioned frame and mounted thereon for pivotal movement about a longitudinal axis, means driven by said motor for pivoting said turning frame about said longitudinal axis, a cutter frame pivoted to said turning frame for pivotal movement with respect thereto about an axis perpendicular to the axis of pivotal movement of said turning frame, means driven by said motor for pivoting said cutter frame about its axis of pivotal connection to said turning frame, a support frame mounted for movement towards and away from said cutter frame in a plurality of parallel planes, means driven by said motor for moving said support frame towards and from said cutter frame, a chain-carrying cutter bar mounted on said support frame for pivotal movement about an axis perpendicular to the plane of travel of said cutter chain, and means driven by said motor for pivotally moving said cutter bar about its axis of pivotal connection of said support frame at a feeding speed when said frames are in various positions of adjustment with respect to each other, said means for pivoting said turning frame being driven by a member coaxial with the axis of pivotal movement thereof, and said means for pivotally moving said cutter frame, moving said support frame towards and from said cutter frame, and pivoting said cutter bar at a feeding speed being driven from a shaft journaled in the forward end of said cutter frame and given by said member.

13. In a track-mounted mining machine, a truck having a turntable thereon, cutting mechanism mounted on said turntable including a motor having a frame extending forwardly therefrom beyond the forward end of said turntable, a turning frame extending forwardly of the forward end of said first-mentioned frame and mounted thereon for pivotal movement about a longitudinal axis, means driven by said motor for pivoting said turning frame about said longitudinal axis, a cutter frame pivoted to said second-mentioned frame for pivotal movement with respect thereto about an axis perpendicular to the pivotal axis of said second-mentioned frame, means driven by said motor for pivoting said cutter frame about its axis of pivotal connection to said second-mentioned frame, a support frame mounted for movement towards and away from said cutter frame in a plurality of parallel planes, means driven by said motor for moving said support frame towards and from said cutter frame, a chain-carrying cutter bar mounted on said support frame for pivotal movement about an axis perpendicular to the plane of travel of said cutter chain about said cutter bar, and means driven by said motor for pivotally moving said cutter bar about its axis of pivotal connection to said support frame at a feeding speed when said frames are in various positions of adjustment with respect to each other, said means for pivoting said turning frame being driven by a member coaxial with the axis of pivotal movement thereof, and said means for pivotally moving said cutter frame, moving said support frame towards and from said cutter frame, and pivoting said cutter bar at a feeding speed being driven from a shaft journaled in the forward end of said cutter frame and driven by said member through a universal extensible drive connection.

WILLIAM W. SLOANE.